March 10, 1936.  J. E. SHAFER  2,033,156

BEARING

Filed July 27, 1931

Inventor.
Julius E. Shafer.
Atty.

Patented Mar. 10, 1936

2,033,156

UNITED STATES PATENT OFFICE 2,033,156

BEARING

Julius E. Shafer, Fort Wayne, Ind.

Application July 27, 1931, Serial No. 553,246

9 Claims. (Cl. 308—207)

This invention relates to bearings provided with lubricant-retaining members.

More specifically my invention relates to sealed anti-friction bearings for carrying radial and/or two-direction thrust loads. Bearings according to my invention are adapted to be mounted in pillow blocks and serve as means for mounting shafting.

One object of my invention is to provide a bearing of what may be called a non-adjustable type and of a structure which is inexpensive to produce, effective in action, easily mounted or dismounted and is self-aligning.

Another object of this invention is to provide a sealed bearing with lubricant retaining members so that the bearing may be lubricated at the time of its assembly at the manufacturing plant and thus prevent the bearing from being burned out in the event that it is not lubricated when installed for service.

Other and further objects of this invention will be apparent from the following specification and drawing which form a part of this specification.

On the drawing.

As shown on the drawing.

The same reference numerals indicate identical parts in both figures.

Figure 1:
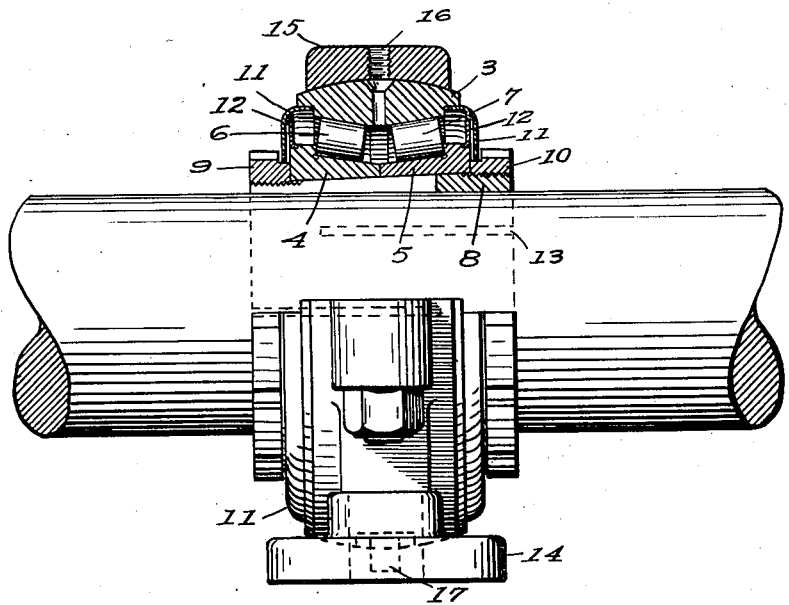
Figure 1 is a side view, partly in section, of a bearing embodying my invention, and showing a portion of a shaft carried thereby and a pillow block mounting.
Figure 2:
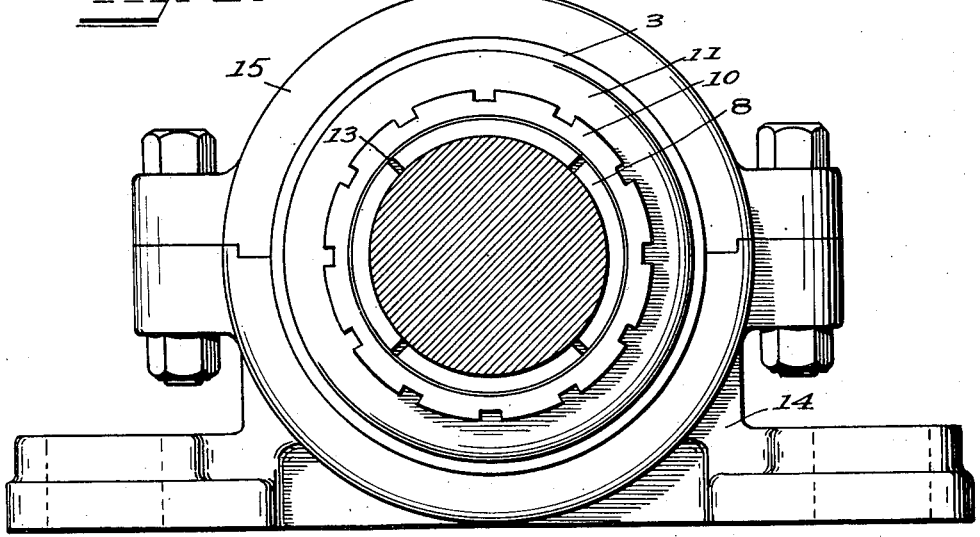
Figure 2 is an end view of Figure 1 looking from the right.

Referring more particularly to Figure 1, it will be noted that the bearing itself comprises an outer race ring 3, a pair of inner race rings 4 and 5, a set of rolling elements 6 between the inner race ring 4, and the outer race ring 3, a similar set of rolling elements 7, between the race ring 3 and the race ring 5, and a member for connecting the bearing to the shaft such as the contractible adapter sleeve 8. In addition to the above mentioned parts, the adapter sleeve 8 carries a nut 9 on one end for drawing the parts together and a lock nut 10 on the other end. The race rings carry lubricant-retaining members which will be presently described. The outer race ring 3 has its outer surface formed as a central section of a sphere, while its inner surface is preferably formed with raceways adapted to carry radial and thrust loads toward the center of the width of the race ring. Each of the outer or end faces of the race ring 3 as shown is preferably chambered to receive a pressed steel retainer member 11 which extends toward the axis of the bearing and overlaps the large diameter of the inner race ring and serves to maintain these race rings and the rolling elements in approximate operating position, even when the connecting adapter 8 is removed. The retainer members 11 also serve as a part of a labyrinth packing to retain lubricant within the bearing. Each of the inner race rings 4 and 5 carry an outwardly extending flange 12 which cooperates with the retainer 11 to form the labyrinth packing.

The inner surfaces of both race rings 4 and 5 are preferably finished to a continuous taper, and the outer surface of the connecting adapter sleeve 8 is correspondingly formed. The adapter sleeve 8 is threaded at each end to receive the nuts 9 and 10 which, as shown, may be exteriorly formed to be adjusted in any suitable manner. The adapter 8 is axially slotted as at 13, said slots alternating from opposite ends whereby to permit the bore of the adapter to be contracted and thereby engage with the shaft upon which the bearing is mounted when nuts 9 and 10 are advanced toward their operative position. It should be understood, however, that any means for securing the bearing to the shaft may be used.

The pillow block shown consists of the base 14 and upper section 15, the bearing ring surface being spherically formed to permit the bearing to find its proper running position.

Any suitable lubricant admission passage 16 is provided, and a pin 17, entering a slotted portion of the race ring 3, prevents the latter from rotating without its mounting.

To assemble the bearing shown in the drawing, after the parts have all been produced, the rolling elements (shown as tapered rollers, although it is obvious that balls or other anti-friction elements may be used) and the inner race rings are assembled in the outer race ring, the flange 12 having been previously applied to the inner race, and the retainers 11 pressed into engagement with the outer race ring 3.

In assembling the bearing upon a shaft independently of the pillow block construction, the adapter 8 with nut 10 partly removed and the nut 9 wholly removed therefrom is first placed in the proper position upon the shaft. The bearing assembly comprising a unit formed of parts 3, 4, 5, 6, 7, and 11 is then slid into position upon the adapter 8 until the tapered space of the sleeve and the tapered inner faces of the race rings 4 and 5 contact. The nut 9 is then replaced upon the adapter 8 until the nut engages one side face of the inner race ring 4. Upon continued movement of the nut 9, the unit composed of parts 3, 4, 5, 6, 7, and 11 is moved axially upon the adapter 8 thereby contracting the latter into tight engagement with the shaft. When this action has been completed, the nut 10 is then tightened into engagement with one side face of the inner race ring 5 to hold the entire assembly in its adjusted position upon the shaft. It should be understood that any means for connecting the bearing to the shaft may be used in place of the adapter and nuts 9 and 10. For example, it is obvious to those skilled in the art that a set screw arrangement may be used.

If the bearing and its shaft are to be mounted in the pillow block shown in the drawing, the strap or upper portion 15 of the pillow block is removed and the shaft and its bearing placed in the base 14 and the strap 15 replaced.

To dismount the bearing from the shaft after having moved the parts from the pillow block or other mounting, the nut 9 is first unscrewed and then the nut 10 is used to move the inner race rings of the adapter toward the same end thereof to release the race ring from the adapter and the adapter from the shaft.

I am aware that many changes may be made and numerous details of construction may be varied through a wide range without departing from the principles of this invention, and therefore do not purpose limiting the patent granted hereon otherwise than necessitated by the prior art.

I claim as my invention:

1. In a bearing, the combination of an outer race ring having an interior raceway formed therein, a pair of inner race rings having exterior raceways formed thereon, rolling elements for the bearing, a retaining ring cup on each side of the outer race ring and overlapping the inner race rings to maintain them in approximate operating assembly, a continuously tapered seat formed through both inner race rings, an adapter extending through both inner race rings, and a nut threaded upon one end of the adapter for bringing the parts into operative relation.

2. In a bearing, the combination of an outer race ring having a spherical outer surface and provided on each side with a retainer mounting portion, a housing for the outer race ring and engaging the spherical surface thereof to form a mounting therefor, an inner race ring having a tapered bore, rolling elements between the race ring, an exteriorly tapered sleeve within the inner race ring and projecting on both sides thereof, a retainer carried by each side of the outer race ring and provided with a central opening of less diameter than the maximum diameter of the inner race ring, an adjusting member on each extension of the sleeve and cooperating with the inner race ring to move the sleeve in either direction and cooperating with the retainer to exclude foreign substances from the bearing and retain lubricant therein.

3. A sealed bearing unit adapted to be mounted in a pillow block and carry a shaft, comprising an outer race ring having an outer surface for engaging the pillow block, an inner race ring adapted to be secured to the shaft, anti-friction elements between the inner and outer race ring, radially extending portions on the sides of the inner race ring and a retaining member extending inwardly from each side of the outer race ring and overlapping the radially extending portion of the inner race ring, said members cooperating to retain lubricant in the bearing and exclude dirt from entering the bearing from the outside.

4. A bearing unit for mounting in pillow blocks and the like comprising, in combination, a shaft adapter having a tapered outside surface, a tapered inner race ring carried by said adapter, an outer race in spaced relation from said inner race ring, anti-friction means between said race rings, radially extending edge portions on said inner race ring, retaining members on the outer ring extending over the edge portion of said inner ring, and nuts in screw thread relation with the adapter cooperating with the inner race ring to move said adapter and cooperating with the retainer members to exclude foreign substances from the bearing and retain lubricants therein.

5. A sealed bearing unit comprising an outer race ring having an interior raceway, an inner race ring structure in spaced relation from the outer race ring, said structure defining an outer raceway in the central portion thereof and a peripheral groove near the side thereof, anti-friction means between the inner and outer race rings cooperating with the raceways thereon, a retaining member carried by said inner race ring structure and extending radially therefrom, a second retaining member carried by the outer race ring and extending laterally and inwardly therefrom to overlap the other retainer member and extend into said groove in spaced relation from the walls of the groove.

6. A sealed bearing unit comprising an outer race ring, an inner race ring structure, anti-friction means disposed between said inner and outer race ring, said inner race ring structure defining peripheral grooves near the sides thereof, retainer members carried by said inner race ring structure and extending radially therefrom near the sides thereof, other retaining members carried by the outer race ring and extending inwardly therefrom to overlap the first mentioned retainer members and extend into the grooves defined by the inner race ring structure in spaced relation to the walls of the grooves.

7. In a bearing, the combination of an outer race ring having an interior raceway formed therein, a pair of inner race rings having exterior raceways formed thereon in spaced relation from the interior raceway of the outer race ring, said inner race rings being adapted to be seated around a shaft, anti-friction means between said inner and outer race rings bearing on the raceways thereof and retainer members carried by the outer race ring at each side thereof and extending inwardly to overlap the inner race rings for maintaining the bearing in operative assembly even when removed from a shaft.

8. A bearing unit comprising an outer race ring having an interior raceway, a pair of inner race rings adapted to be seated around a shaft in spaced relation from the outer race ring, said inner race rings having outer raceways thereon, anti-friction means bearing on the interior raceway of the outer race ring and on the outer raceway of said inner race ring, retainer members carried by the inner race rings near the outer edges thereof and extending radially therefrom and retaining members carried by the outer race ring extending outwardly and inwardly therefrom to overlap the retaining members carried by the inner race ring whereby the bearing is sealed and maintained in operative assembly even when disengaged from a shaft.

9. A sealed bearing unit comprising an outer race ring having an interior raceway, an inner race ring structure in spaced relation from the outer race ring, said structure including means defining an outer raceway in the central portion thereof and a peripheral groove near the side thereof, anti-friction means between the inner and outer race rings cooperating with the raceways thereon, a retaining member carried by said inner race ring structure and extending radially therefrom, and a second retaining member carried by the outer race ring and extending inwardly into said groove in spaced relation from the walls of the groove to overlap the first-mentioned retaining member.

JULIUS E. SHAFER.